Patented June 9, 1936

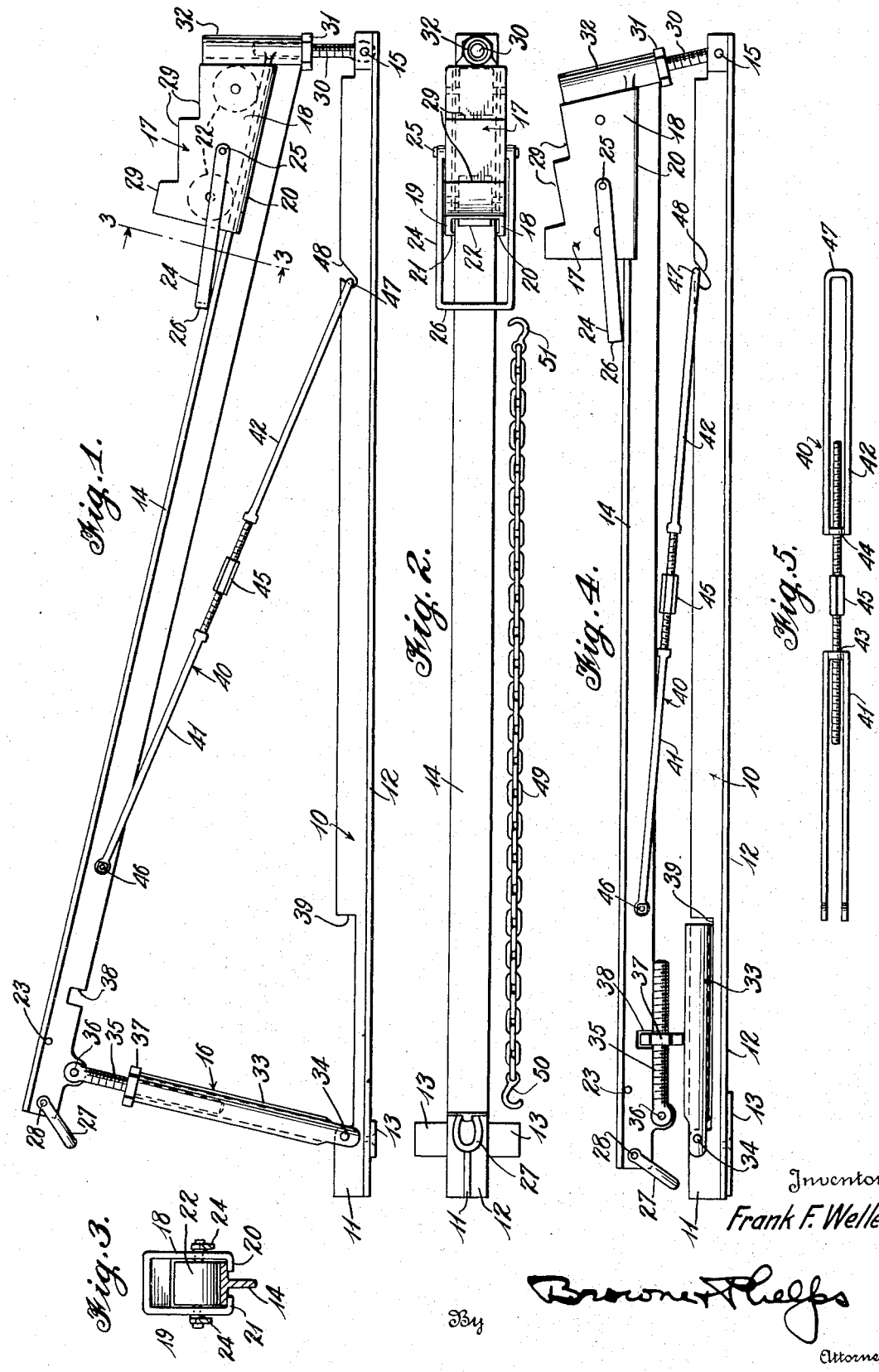

2,043,820

UNITED STATES PATENT OFFICE 2,043,820

AUTOMOBILE JACK

Frank F. Weller, Jennings, La., assignor of fifty per cent to James O. Modisette, Jennings, La.

Application August 27, 1934, Serial No. 741,679

8 Claims. (Cl. 254—88)

The invention relates to jacks and has as an object the provision of a jack especially useful for the purpose of lifting a wheel of an automobile as for the purpose of changing a tire.

It is a further object of the invention to provide a jack which may be utilized to raise a wheel of an automobile by power furnished by the driving means of the car.

It is a further object of the invention to provide a device of this character having means for ready adjustment of the parts as to height.

It is a further object of the invention to provide a device of this character which may be collapsed for storage.

Further objects of the invention will appear from the following description when read in connection with the accompanying drawing showing an illustrative embodiment of the invention, and wherein:

Figure 1 is a side elevation;

Fig. 2 is a plan view also showing a chain to be used with the invention laid alongside the jack;

Fig. 3 is a detail vertical section on line 3—3 of Fig. 1;

Fig. 4 is a side elevation of the device collapsed; and

Fig. 5 is a detail plan view of a brace member.

As shown the device comprises a base member 10 desirably formed of a T beam having a vertical flange 11 and a base 12 to be placed in contact with the ground. To increase the surface of the base member upon the ground for lateral stability, a shoe 13 is shown which may be pivotally connected to the base 12 whereby it may be swung into longitudinal registry with the base 12, as indicated in Figure 4.

A beam member 14 is shown having a pivotal connection at 15 with an end of the base 10 and having a strut member 16 reacting between the base 10 and the beam 14 to hold the beam in the inclined position shown in Figure 1.

To contact with a portion of an axle of a car to be lifted, there is shown a block 17 slidably mounted upon the upper surface of the beam 14 which latter is also indicated as of T formation as shown in Figure 3. The block 17 is shown as formed of a shell comprising vertical side members 18, 19, and lower edges inturned as at 20, 21, Figure 3, and underlapping the horizontally extending portions of the beam 14. To reduce friction, the block is shown as provided with rollers 22 pivotally mounted in the block 17 to travel therewith.

A pin 23 is shown upon the vertical member of the beam 14 adjacent its upper end to act as a stop by contact of the portions 20, 21 of the block therewith, when the block has been moved to its uppermost position. To automatically lock the block in its uppermost position, when the vehicle has been raised by the device, there is shown a bail 24 pivoted to the block as at 25 and having a cross member 26 which, when the block has been slid to its uppermost position, will automatically fall over the end of the beam and prevent retrogression of the block without application of the emergency brake of the vehicle.

When it is desired to lower the vehicle, the bail 24 may be lifted from locking position by means of a lever 27 pivoted at 28 to the end of the beam 14, lifting of which lever will lift the bail 24 from its locking position and allow the vehicle by gravity to slide back off from the jack.

The block 17 is desirably formed with steps 29 so that the device may be applied to axles of different heights without adjustment of the parts. To adjust the beam member to axles of a height not coming within the range of the steps 29, the connection of the beam with the base member at their lower end is shown as comprising a screw-threaded member 30 which is pivoted to the base, carrying a nut 31 coacting with a tubular member 32 into which the member 30 enters. The tubular member 32 is rigidly secured to the end of the base member 10 as by electric welding or the like.

To adjust the strut member 16, the same is shown as comprising a lower tubular member 33 pivoted at 34 to the base member 10 and telescopically receiving a threaded rod 35 pivoted at 36 to the beam 14. An adjusting nut 37 is shown received upon rod 35 and bearing against the upper end of the tubular member 33.

To collapse the jack for storage, the beam 14 may be raised until the threaded rod 35 leaves the tubular member 33 when the parts may be swung to the position shown in Figure 4, a notch 38 being provided in the beam 14 to receive the nut 37 and a notch 39 being formed in the base member 10 to receive the tubular member 33.

It will be seen that the jack in its extended position of Figure 1 comprises a triangle but that the connection of the triangle to the base 10 and of the strut 16 to both the base 10 and the beam 14 are pivotal points. This structure introduces a possibility of a movement of the triangle out of its correct relation under the strains of use. To prevent such movement, there is shown a brace member 40, shown in plan view in Figure 5, as comprising straps 41, 42 having cross members 43, 44 provided with screw-threaded holes to receive a turnbuckle arrangement 45 whereby the length of the brace may be adjusted.

The brace is indicated as pivoted to the vertical member of the beam 14 and as provided with a cross member 47 taking into a notch 48 in the base member 10. When the device is collapsed, the cross member 47 readily leaves its seat to assume the position shown in Figure 4.

The device may be used as shown in Figure 1 upon the front axle of a vehicle by being placed under the front axle with the same in contact with one of the steps 29 whereupon the automobile may be driven forward either under power of the motor or the self-starter to cause the axle to be lifted from the ground and automatically held in raised position to be readily released when desired as described above.

To lift a rear axle of the automobile, the device will be placed in the same manner under a portion of the rear axle and the automobile driven in reverse to lift the same. However, as is well known, when a rear axle of the automobile is raised from the ground, the power becomes ineffective to drive the machine because of the nature of the differential with which all automobiles are equipped.

To enable the device to be utilized to lift a rear wheel of the automobile, means are provided as indicated in Figure 2 comprising a chain 49 carrying a hook 50, 51, at each end. One of the hooks as 50 may be engaged with any portion of the jack as for instance about the rod 35 and the remaining hook may be engaged with a spoke of the wheel to be lifted or with an opening formed in a disc wheel or the chain may be passed around the tire and the hook 51 engaged with the chain itself, thus forcing the same pull by the wheel to be lifted as that exerted by the wheel on the ground. After the wheel has been lifted, and is held locked in raised position by action of the bail 24, the chain may be removed for access to the wheel to remove the tire.

The form illustrated is that at present preferred but it is obvious that many other forms of the strut 16 and of the pivot connection of the beam 14 to the base 10 at the lower end thereof may be utilized, if it is found that all of the adjustments as to elevation are not required in service.

Minor changes may be made in the physical embodiment of the invention within the scope of the appended claims without departing from the spirit thereof.

I claim:

1. A jack comprising, in combination: a base member; a beam member pivoted at one end to an end of the base member; a strut coacting between the remaining ends of said members to support the beam member in position upwardly inclined from said pivoted end; a block slidable on said beam member; and means whereby said strut may be released from supporting position and folded against one of said members and said beam to a position substantially parallel with said base for collapse of the jack.

2. A jack comprising, in combination: a base member; a beam member pivotally connected at one end to an end of said base member; a strut to coact between the remaining ends of said members and of a length to support the said remaining end of a beam higher than said pivoted end, comprising a tubular member pivoted upon one of said members and a threaded rod pivoted upon the remaining member to telescope with said tubular member, and an adjusting nut upon said rod bearing upon the free end of said tubular member; the device foldable by separation of said strut members and swinging the same into parallelism with the respective first-named members and said beam into parallelism with the base.

3. A jack comprising, in combination: a base member; a beam member; means to connect adjacent ends of said members; means to coact between the remaining ends of said members to support the beam member in position upwardly inclined from said pivoted end; and a brace member acting in tension between the beam member adjacent its supported end and said base member adjacent its beam connected end.

4. A portable collapsible jack comprising, in combination: an elongated base member; a beam member of substantially the same dimensions as said base member; pivot means connecting one end of each member; a strut pivoted upon said base member adjacent its remaining end; a readily detachable connection between said strut and said beam member adjacent its free end; said strut of a length to support the beam in position upwardly inclined from said pivoted end; said base member cut away to allow close folding of said strut thereon; a slidable block carried by said beam member and supported thereby at an elevation to engage a car axle.

5. A collapsible jack comprising, in combination: a base; a beam pivoted at one end upon an end of said base; readily separable means reacting between the remaining ends of said base and beam to hold said remaining end of the beam elevated above said pivoted end; and means slidable on said beam to receive a part of a vehicle to be lifted; whereby movement of the vehicle may lift a portion thereof by travel of the slidable means upward along the beam; said elements so constructed and arranged that upon separation of said first named means from reacting position the beam may be swung to parallelism with said base for storage.

6. A collapsible jack comprising, in combination: a base member; a beam member; means to pivotally connect adjacently placed ends of said members including means to adjust the separation of said ends; a readily detachable strut member coacting between the remaining ends of said members to hold said ends separated with said beam member in position upwardly inclined from said pivoted ends; and means slidable on the beam member to receive a part of a vehicle to be lifted; said elements so constructed and arranged that upon separation of said first named means from reacting position the beam may be swung to parallelism with said base for storage.

7. A collapsible jack comprising, in combination: a base member; a beam member pivotally connected at one end to said base member; readily detachable strut means to support the free end of said beam member raised above the base member; means whereby said strut may be readily detached for collapse of said beam upon said base; means to adjust the effective length of the strut member whereby to adjust the elevation at which the beam member is supported by the strut member; and a block slidable on the beam member to engage a part of a vehicle to be lifted.

8. A collapsible jack comprising, in combination: elongated base and beam members; struts of unequal length pivoted to the base member adjacent its ends and respectively engaging the beam member adjacent its ends; means to vary the effective length of each of said struts; the longer of said struts detachable from beam supporting position to permit movement of the beam about the pivot of the shorter strut from collapse of the jack; the height of the collapsed jack being not substantially more than one-third greater than the combined thickness of said beam and strut; and axle-engaging means slidable on said beam.

FRANK F. WELLER.